Aug. 16, 1966 B. P. OCHSNER ETAL 3,267,445

MAGNETIC MEMORY CIRCUITS

Filed Nov. 9, 1962 4 Sheets-Sheet 1

INVENTORS: B.P. OCHSNER
J.L.SMITH
BY John F Powell
ATTORNEY 3,267,445

MAGNETIC MEMORY CIRCUITS

Brandt P. Ochsner, Gillette, and James L. Smith, Bedminster, N.J., assignors to Bell Telephone Laboratories, Incorporated, New York, N.Y., a corporation of New York Filed Nov. 9, 1962, Ser. No. 236,665
13 Claims. (Cl. 340—174)

This invention relates to information storage arrangements and more particularly to such arrangements in which information is stored in the form of remanent magnetization states within magnetic memory elements.

Magnetic information storage arrangements employing magnetic memory elements as information storage addresses are well known in the information handling and processing art. The substantially rectangular hysteresis characteristics of the magnetic materials of which such elements are fabricated enable them to store binary values by being magnetized in either of two remanent flux states. The well known toroidal magnetic core, for example, has one binary value associated with one of the remanent states and the other binary value with the other of the remanent states. Which of the binary values is stored in the core at any given time is determined by applying a readout current pulse to a winding inductively coupled to the core. Should a reversal of the magnetic flux from one of its remanent states to the other remanent state occur as a result of the applied readout current pulse, a voltage will be induced across a sensing winding also inductively coupled to the core with voltage will be indicative a particular binary value.

Other information storage arrangements employing magnetic memory elements are disclosed in the copending application of A. H. Bobeck and J. L. Smith, Ser. No. 215,318, filed Aug. 7, 1962, which application may be considered incorporated herein by reference. One arrangement disclosed in the aforesaid application utilizes a high magnetic permeability base plate having two sets of orthogonal slots therein forming a plurality of posts in the base plate. A sheet of magnetic material having a substantially rectangular hysteresis characteristic is positioned across the tops of the posts. Information is stored on a word-organized basis with a word conductor inserted in each slot of one of the sets of orthogonal slots. Each pair of posts having a word conductor therebetween together with the overlay magnetic sheet comprises a magnetic cell and adjacent ones of said cells having the same word winding therebetween comprise bit addresses of the array. Bit conductors pass in zig-zag fashion through the two sets of slots such that each bit address has a single bit conductor passing on one sense between the posts of one cell of the address and in the opposite sense between the posts of the other cell of the address. Each bit conductor passes between the posts of one bit address associated with each of the word conductors. Both the word and bit conductors are advantageously inserted in the slots between the posts of the base plate by means of a printed circuit board. The board comprises an insulator with conductors etched on each side thereof by printed circuit techniques. Apertures in the board are arranged to correspond with the posts of the base plate to enable the board to be fitted over the posts.

Information is stored in the bit addresses comprising a single word by applying simultaneous input signals to a selected word conductor and to each of the bit conductors, the particular binary value stored in each bit address being determined by the polarity of the signal applied to its associated bit conductor. The input signals applied to the word and bit conductor are of a magnitude such that their sum produces a magnetizing force which exceeds the coercive force of the overlay magnetic material while their difference produces a magnetizing force less than the coercive force. One cell of each bit address of the selected word location is thereby switched from a remanent magnetic condition initially uniform in all of the cells to an opposite remanent condition. Interrogation is achieved by applying an opposite polarity signal to the word conductor of a magnitude sufficient to re-establish uniform remanent conditions in all the cells of the word location being interrogated. Signals induced on the bit conductor during interrogation are detected, their polarities manifesting the information stored in respective addresses of the interogated words.

The magnetic flux path within any of the cells passes through the base plate, a pair of posts, and the portion of the overlay sheet between the posts. Since the base plate and posts are constructed of a high permeability material, the total reluctance of the path depends almost entirely upon the reluctance of the portion of its length which passes through the square loop overlay material. Consequently, the required magnitudes of write and read current pulses applied to word and bit conductors threading the posts are also dependent upon the length of square loop material between the posts and therefore upon the distance between the two posts of each magnetic cell. The minimum distance between the posts of each cell is generally limited by the required threading of word, bit, and other conductors between the posts. A compromise must therefore be made between decreasing the distance between the posts in order to decrease the necessary magnitudes of applied signals and increasing the distance in order to permit a maximum ease of wiring. When boards containing printed wiring patterns are fitted over the posts of the base plate, the distance between the posts of each cell is necessarily further limited by the portions of the board which fit between the posts. These portions of the board must be wide enough both to provide structural support and to carry printed circuit wiring patterns thereon.

Accordingly, it is an object of this invention to provide a magnetic memory circuit of the type hereinbefore described in which read and write current pulses of smaller magnitude may be untilized.

It is another object of this invention to provide a magnetic memory circuit of the type hereinbefore described in which the effective distance between the posts thereof may be substantially decreased.

It is a further object of this invention to provide a magnetic memory circuit of the type hereinbefore described utilizing printed circuit wiring techniques in which the effective distance between the posts thereof is limited only by the magnetic characteristics of the square loop overlay material.

By merely positioning the posts of each memory cell closer together, the required magnitude of applied read and write current pulses would be diminished but other problems in addition to those conected with the threading of conductors between the posts would thereby be created. As the posts of a memory cell are positioned closer together, the inductance of conductors threading the posts, as seen by signal sources connected to the conductors, increases. This increase in inductance results in an increased back electromotive force inducted in the conductors upon the application of signals thereto and an increased delay time in the transmission of the signals along the conductors.

Accordingly, it is another object of this invention to provide a magnetic memory circuit of the type hereinbefore described having a minimum effective distance between the posts thereof in which a faster read-write cycle time is achieved.

It is yet another object of this invention to provide a magnetic memory circuit of the type hereinbefore described having a minimum effective distance between the posts thereof in which the storage capacity thereof is substantially increased.

A further object of this invention is to provide a magnetic memory circuit of the type hereinbefore described having a minimum effective distance between the posts thereof which can be driven by read and write signal sources having a smaller magnetic flux supplying capacity than heretofore permissible.

It is a still further object of this invention to provide a magnetic memory circuit of the type hereinbefore described possessing mechanical advantages over such prior circuits.

Yet another object of this invention is to provide a new and improved memory circuit.

A still further object of this invention is to provide a magnetic memory circuit of the type hereinbefore described which is easily adaptable to operation according to any of a number of circuit configurations.

The above and other objects of this invention are realized in one embodiment of a memory array according to the principles of this invention which comprises a high magnetic permeability base plate having a plurality of posts formed thereon by two sets of orthogonal slots cut into the base plate. A plurality of conductors are inserted into the slots between adjacent posts by means of a printed circuit board to which they are affixed. The board is adapted by means of a pattern of apertures therein to fit neatly over the posts of the base plate. A sheet of magnetic material having substantially rectangular hysteresis characteristics and also having particular patterns of high magnetic permeability material affixed thereto is positioned across the tops of the posts. The high permeability material may be affixed to the sheet by well known printed circuit techniques such as, for example, evaporation through a mask. The patterns of high permeability material are positioned on the sheet such that each post is contiguous to a particular portion of the high permeability material. The portions of magnetic material are thereby effectively rendered extensions of their respective posts.

A magnetic cell is defined in the array by a pair of adjacent posts, the portion of the base plate between them, the two portions of high permeability material contiguous respectively to the posts and that portion of the square loop sheet between the two high permeability portions. Since the two portions of high permeability material may be positioned any predetermined distance apart on the square loop sheet to which they are affixed, a flux path within the cell passes entirely within high permeability material except for the predetermined length of square loop material between the two high permeability portions. Since the total magnetic reluctance of the path depends almost entirely upon that portion of its length within the square loop material, the total reluctance is considerably reduced by the presence of the two portions of high permeability material which are much closer together than are their respective posts. As a result, the required magnitudes of write and read signals applied to conductors threading the posts are greatly diminished over those required in previous arrangements having posts the same distance apart. Consequently, the posts may be positioned a distance apart sufficient to permit ease in positioning conductors between the posts while achieving a reduction in the required magnitudes of applied signals previously realized only by positioning the posts physically close together. Such close positioning of the posts has, however, the disadvantage of increasing the inductance of conductors threading them, thereby, for an array of predetermined storage capacity, increasing the read-write cycle time and increasing the amount of flux required from associated signal sources. This disadvantage is also overcome by the present invention.

Moreover, the pattern of high permeability material affixed to the overlay sheet may comprise discrete portions of material having predetermined shapes. Thus, in another embodiment according to the principles of this invention, a memory array utilizing a high permeability base plate having posts thereon formed by two sets of orthogonal slots is made to operate in a manner similar to that described in a copending application of A. H. Bobeck and J. L. Smith, Ser. No. 215,448, filed Aug. 7, 1962. Base plates having posts formed by two sets of slots therein are much easier to fabricate, for example by machining the slots, than are base plates having pairs of angularly positioned posts as shown in the aforesaid application. According to the present invention, however, posts formed by parallel slots may be effectively transformed into pairs of angularly positioned posts by means of patterns of high permeability material superimposed upon the posts. The patterns are affixed to the square loop overlay sheet and are positioned on the sheet such that the composite posts formed by the base plate posts and their respective patterns of high permeability material form pairs of angularly positioned posts as described in the copending application previously referred to.

Another embodiment according to the principles of this invention represents an improvement over the memory array disclosed in the copending application of A. H. Bobeck and J. L. Smith, Ser. No. 215,318, filed Aug. 7, 1962, in which the word and bit conductors follow straight line paths between the posts, each bit address comprises four rectangularly positioned posts and binary information is stored by means of remanent magnetizations in a square loop overlay material, the magnetizations being along either of the two diagonals of the posts. Although information is stored by means of remanent magnetizations in a diagonal direction, other remanent magnetizations are set up in horizontal and vertical directions and periodically reversed during the operation of the array. A part of the energy supplied by associated signal sources is therefore utilized in establishing and switching these latter magnetizations. Furthermore, the diagonal magnetizations do not switch at precisely the same rate since the diagonal paths include differing lengths of the square loop overlay material and thus have differing values of reluctance. For example, the path from one corner of a post to the corner of the diagonally opposite post is shorter than any other diagonal path between the two posts. In the improved arrangement according to this invention, patterns of high permeability material affixed to the square loop overlay sheet are positioned contiguous to the posts such that selected diagonal flux paths have a substantially lower reluctance than do horizontal and vertical paths and are thereby preferred over the latter paths during the operation of the array. The patterns of high permeability material are also designed to include the same length of square loop material in each of the preferred diagonal flux paths thereby insuring that the remanent magnetizations in these paths switch at the same time.

Thus, it can be seen that another advantage of the present invention is that a single high permeability base plate having posts formed thereon can be adapted, by means of various patterns of high permeability material on square loop overlay sheets used therewith, to operate in accordance with any of a number of circuit configurations.

Another advantage of this invention is that a multipurpose pattern of high permeability material may be affixed to a single square loop overlay sheet to form, in conjunction with several high permeability base plates having posts formed thereon, structures utilizable in any of several different circuit configurations dependent upon the positioning of the overlay sheet relative to the several base plates.

Thus according to one feature of this invention, a magnetic memory array, utilizing a high permeability base plate having a plurality of posts extending therefrom and an overlay sheet of square loop material positioned across the posts, has a particular pattern of high permeability material affixed to the overlay sheet, portions of the high permeability material being contiguous to respective ones of the posts.

According to another feature of this invention, a magnetic memory array utilizing a high permeability base plate having a plurality of posts extending therefrom and an overlay sheet of square loop material positioned across the posts has a pattern of high permeability material affixed to the overlay sheet, portions of the high permeability material being contiguous to respective ones of the posts and being of predetermined shapes such that, together with the posts, composite posts are formed which bear predetermined spatial relationships to one another different from those between the posts of the base plate.

According to still another feature of this invention a magnetic memory array utilizing a high permeability base plate having posts positioned in rows and columns extending therefrom and an overlay sheet of square loop magnetic material positioned across the posts, has a pattern of high permeability material affixed to the overlay sheet, portions of the high permeability material being contiguous to respective ones of the posts and being positioned such that preferred flux paths between diagonally adjacent ones of the posts are established.

According to yet another feature of this invention a magnetic memory array utilizing any of several high permeability base plates having a plurality of posts extending therefrom and an overlay sheet of square loop magnetic material positioned across the posts has a multipurpose pattern of high permeability material affixed to the single overlay sheet, the sheet being positionable relative to the posts of said base plates such that the array is utilizable in a plurality of circuit configurations dependent upon the positioning of the overlay sheet relative to the posts of the several base plates.

A more complete understanding of this invention and of the above and other objects and features thereof may be gained from a consideration of the following detailed description together with the accompanying drawing in which.

Figure 3:
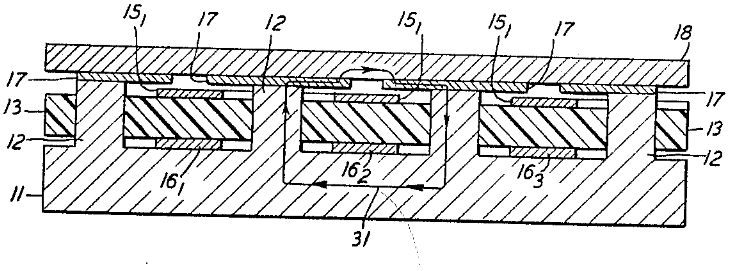
FIG. 3 depicts a sectional view of the array along plane 3—3 shown in FIG. 2.
Figure 4A:
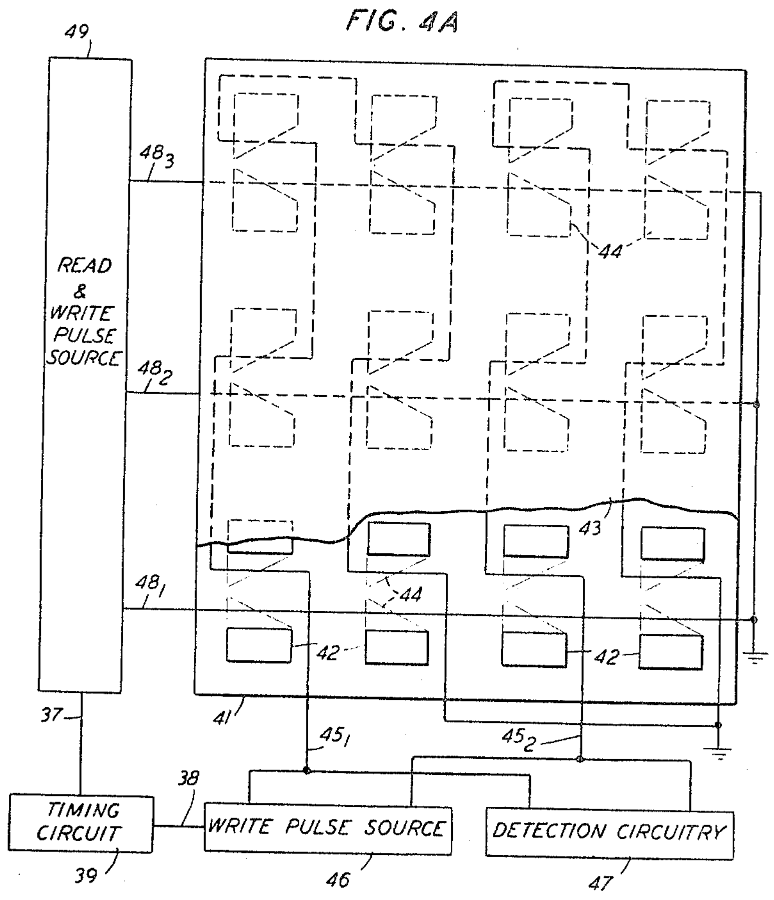
FIG. 4A depicts another specific embodiment in which composite posts having spatial relationships different from those between posts on a base portion are formed by the posts of the base portion and a predetermined pattern of high permeability material affixed to an overlay sheet.
Figure 4B:
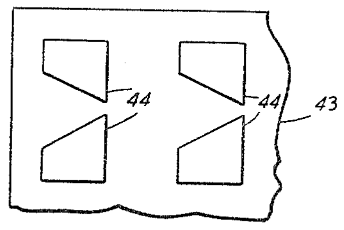
Figure 5:
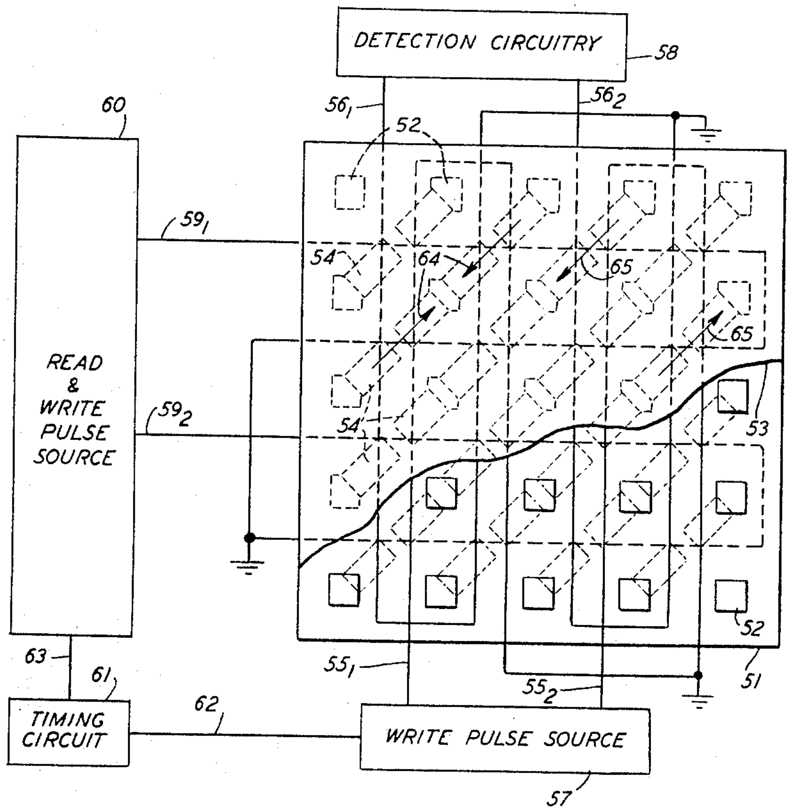

FIG. 4B depicts a portion of the overlay sheet utilized in the array shown in FIG. 3A and illustrates the pattern of high permeability material affixed thereto; and FIG. 5 depicts another specific embodiment in which magnetic flux paths between selected diagonally adjacent posts positioned in rows and columns on a base plate are preferred by means of a pattern of high permeability material affixed to an overlay sheet.

Figure 1:
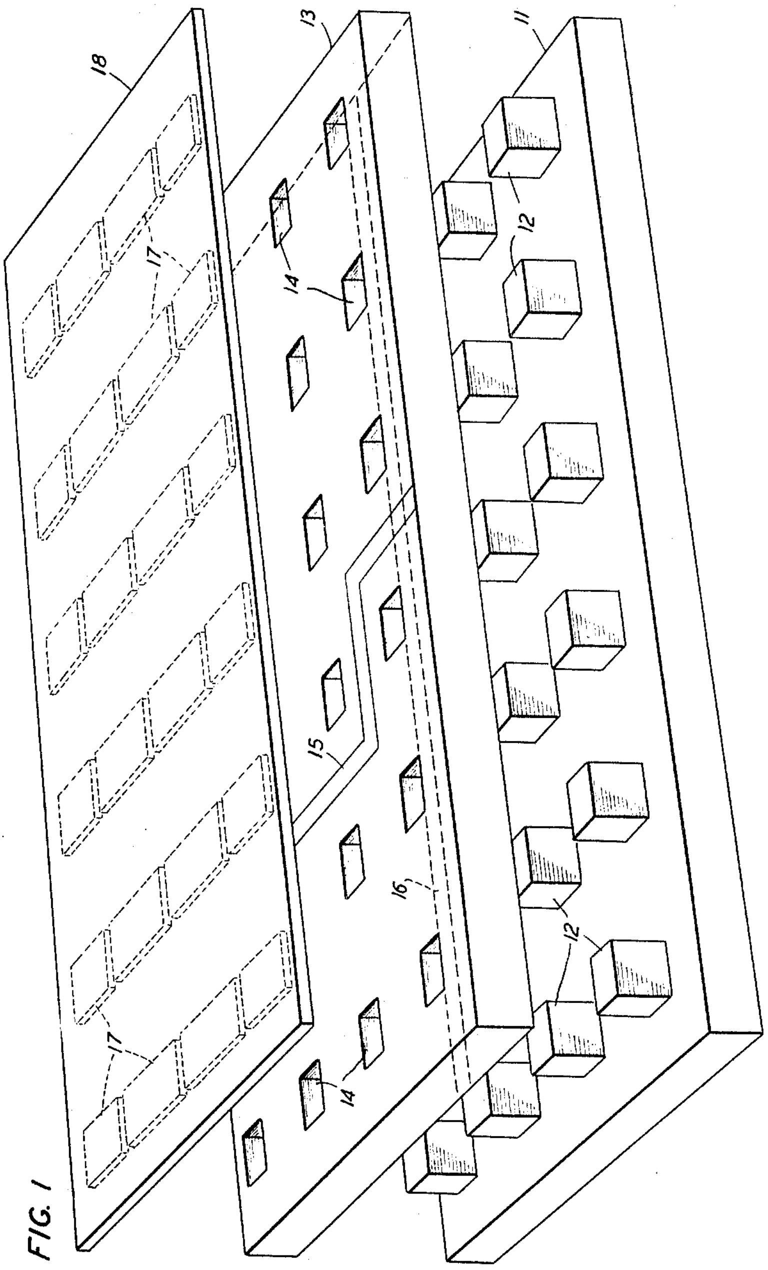
FIG. 1 depicts, in perspective and exploded view, a specific embodiment of a memory array according to the principles of this invention.

A specific illustrative embodiment of a memory array according to this invention is shown, in an exploded view in FIG. 1. A high permeability base plate 11 is shown having a plurality of posts 12 extending therefrom. An insulating board 13 has apertures 14 therein which correspond to the posts 12 of the base plate and enable the board 13 to fit over the posts. Printed circuit wiring patterns, represented by single conductors 15 and 16, are formed by conventional methods on the two sides, respectively, of board 13. For illustrative purposes only, two conductors 15 and 16 are depicted in FIG. 1. Portions 17 of high magnetic permeability materials are affixed to an overlay sheet 18 having substantially rectangular hysteresis characteristics. The portions 17 are affixed to the side of sheet 18 facing the posts 12 and are positioned such that, when the array is assembled, they are contiguous to respective ones of the posts 12. The posts 12 may advantageously be formed on base plate 11 by the cutting of two sets of orthogonal slots in plate 11. The portions of insulating board 13 between the apertures 14 must be of a width sufficient both to accommodate the printed circuit conductors 15 and 16 and to provide structural support for the board 13. Consequently, the slots cut in base plate 11 are of a width such that the posts 12 are positioned sufficiently far apart to enable an insulating board 13 having the required distance between the apertures 14 thereof to slip easily over the posts 12.

Figure 2:
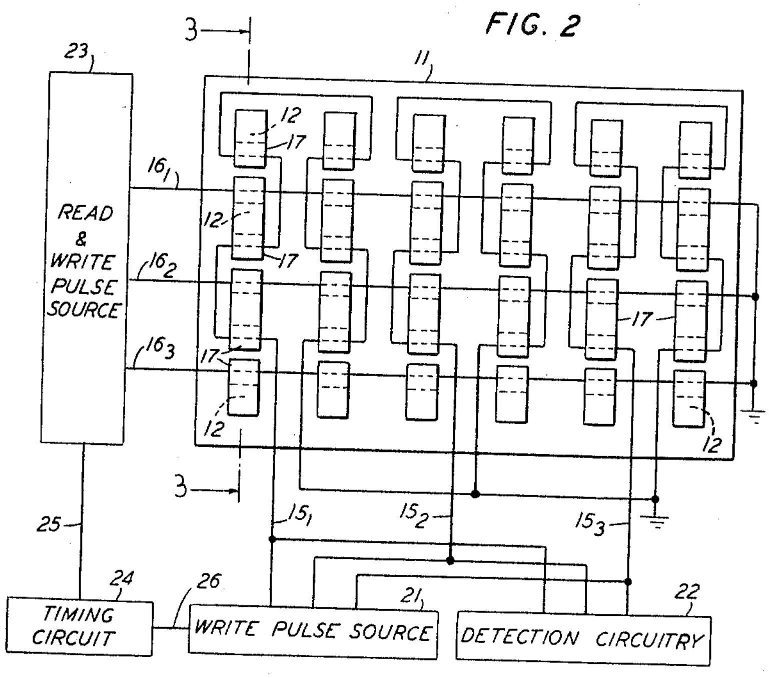
FIG. 2 depicts a top view of the array of FIG. 1.

FIG. 2 depicts a top view, in assembled form, of the array of FIG. 1. For illustrative purposes, overlay sheet 18 and the insulating board 13 are not shown in this view. The pattern of conductors 15 and 16 affixed to board 13 are, however, shown threading the posts 12. Conductors $\mathbf{15}_1$ through $\mathbf{15}_3$ are connected between ground potential and both a write pulse source 21 and detection circuitry 22. Conductors $\mathbf{16}_1$ through $\mathbf{16}_3$ are connected between ground potential and a source 23 of read and write pulses. Timing circuit 24 is connected by means of conductors 25 and 26, respectively, to sources 23 and 21. Moreover, the portions of high permeability material 17, affixed to overlay sheet 18 are shown superimposed over the posts 12.

Pulse sources 21 and 23 are shown in block diagram form and may comprise any well known circuits capable of providing current pulses of the character described hereinafter. Detection circuitry 22 is also shown in block diagram form and may comprise any circuitry capable of detecting signals induced in conductors 15. Timing circuitry 24 is similarly shown in block diagram and may comprise circuitry capable of timing the energization of sources 21 and 23, in the manner described hereinafter, during the write phase of operation.

FIG. 3 depicts a cross section of the array of FIG. 2 taken along plane 3—3 of FIG. 2. A flux path 31 within the memory cell defined at one intersection of conductors $\mathbf{15}_1$ and $\mathbf{16}_2$ is also shown in FIG. 3. It can be seen that the portion of path 31 within the square loop overlay sheet 18 is greatly diminished by the presence of the high permeability portions 17. Furthermore, the total reluctance about path 31 is considerably less than that of a path traversing the length of sheet 18 between the two posts 12 encompassing path 31. This decrease in reluctance permits a reduction in the required current pulse magnitudes supplied from sources 21 and 23.

The present invention, moreover, serves to reduce the required flux supplying capacity of source 23. This results since the inductance of the conductors 16 is significantly less than would be the case of the posts 12 were positioned closer together. With a narrow gap length between posts 12 the inductance of a conductor passing therebetween is dependent in part, upon the depth of the slot between the posts. Thus conductor 16 located near the bottom of the slot would have a greater inductance than would conductor 15 positioned near the top of the slot. Since the flux supplied by source 23 is equal to $\int e\,dt$, $e$ representing the back electromotive force induced in the conductor 16 during the switching time *dt*, and since *e* increases with an increase in the inductance of conductor 16, it can be seen that by reducing the inductance, source 23 may have a smaller flux supplying capacity.

The reduction in the inductance of conductors threading the posts of memory arrays according to this invention also produces a reduced delay time in the transmission of signals along the conductors thereby achieving a faster read-write cycle time and permitting the operation of larger memory arrays having a predetermined maximum cycle time.

The operation of the memory depicted in FIGS. 1, 2 and 3 is similar to that described in connection with FIG. 1 of the aforementioned copending application of A. H. Bobeck and J. L. Smith, Ser. No. 215,318, filed Aug. 7, 1962. Thus, if binary word 101 is to be written into the bit addresses associated with conductor $16_1$, coincident write signals are applied to conductor $16_1$ from source 23 and to conductor $15_1$ through $15_3$ from source 21. The write signals follow a previous negative polarity readout pulse from source 23. The write signals applied to conductors $16_1$, $15_1$, and $15_3$ are of positive polarity while that applied to $15_2$ is of negative polarity. A subsequent negative polarity readout pulse applied to conductor $16_1$ from source 23 induces signals indicative of the value 101 in conductors $15_1$ through $15_3$. Binary information values may be similarly stored and read out of the bit addresses associated with conductors $16_2$ and $16_3$.

The readout pulse signals are of a magnitude sufficient to establish uniform reset remanent magnetic conditions in each memory cell associated with a conductor 16 having such a signal applied thereto. The write signals are of a magnitude such that only one cell of each address is switched to a set remanent magnetic condition as a result of the coincident application of write signals to the conductors 15 and 16.

FIG. 4A depicts another embodiment according to the principles of this invention in which a pattern of high permeability material affixed to an overlay sheet is utilized in conjunction with posts of a base plate to form composite posts having spatial relationships different from those between the posts of the base plate. Rectangular posts 42 are formed on high magnetic permeability base plate 41 by two sets of orthogonal slots cut therein. An overlay sheet 43 of magnetic material having substantially rectangular hysteresis characteristics is positioned over the posts 42 and has a pattern of portions 44 of high magnetic permeability material affixed to the side thereof facing the posts 42. The sheet 43 is aligned relative to the posts 42 such that the portions 44 of high permeability material are contiguous to respective ones of the posts 42. The portions 44 together with their respective posts 42 form a plurality of pairs of composite posts with the posts of each pair being shaped and positioned such that the sides of the posts have a relatively narrow gap length therebetween at one end, a relatively wide gap length at their other end, and gap lengths of intermediate lengths between the needs. As a result of this variation in gap length, flux paths within each memory cell have values of reluctance which vary according to the length of gap included in the paths.

Bit conductors $45_1$ and $45_2$ are threaded between the posts 42, as shown in FIG. 4A, and are connected between ground potential and both write pulse source 46 and detection circuitry 47. Word conductors $48_1$ through $48_3$ are threaded between the posts 42, as shown in FIG. 4A, and are connected between ground potential and read and write pulse source 49. Timing circuit 39 is connected via conductors 38 and 37 to sources 46 and 49, respectively.

Overlay sheet 43 is shown broken away in FIG. 4A in order to show clearly the shape of the posts 42. For illustrative purposes, the portions 44 are shown in "phantom," by means of dot-dash lines, over the posts 42 of the broken away section.

FIG. 4B depicts a part of the overlay sheet 43, showing the side of the sheet facing the posts 42 and several of the portions 44 of high permeability material affixed thereto.

Pulse sources 46 and 49 are shown in block diagram form and may comprise any well known circuitry capable of providing current pulses of the character described hereinafter. Detection circuitry 47 is also shown in block diagram form and may comprise any circuitry capable of detecting signals induced in conductors 45. Similarly, timing circuit 39 is shown in block diagram form and may comprise circuitry capable of timing the energization of source 46 and 49, in the manner described hereinafter, during the write phase of operation.

The embodiment shown in FIGS. 4A and 4B operates in a manner similar to that described in the aforesaid copending application of A. H. Bobeck and J. L. Smith, Ser. No. 215,448, filed Aug. 7, 1962. Each pair of composite posts formed by the posts 42 and high permeability portions 44 comprises a magnetic cell and adjacent ones of the cells aligned along one of the conductors 48 comprise a bit address. Thus, a binary word 10, is, for example, written into the bit address associated with conductor $48_2$, by the application of coincident write signals to conductors $48_2$ from source 49 and to conductors $45_1$ and $45_2$ from source 46. The signals appiled to conductors $48_2$ and $45_1$ are of positive polarity and that applied to conductor $45_2$ of negative polarity. The write signals are applied after a previous negative polarity readout signal from source 49 has established uniform reset remanent magnetic conditions in each of the memory cells associated with conductor $48_2$. The magnetization forces effected by the positive write signals on conductors $48_2$ and $45_1$ are additive in the left hand cell and subtractive in the right hand cell of the bit address defined by these conductors; those effected by the positive write signal on conductor $48_2$ and the negative signal on conductor $45_2$ are additive in the right hand cell and subtractive in the left hand cell of the bit address defined by these conductors. The magnitudes of the write signals are such that considerably more flux is reversed during the write phase of operation in those cells experiencing additive magnetomotive forces than in those experiencing subtractive magnetomotive forces. A subsequent negative polarity readout signal applied to conductor $48_2$ re-establishes the reset remanent magnetic condition in each cell associated with this conductor and induces output signals in conductors $45_1$ and $45_2$ indicative of the binary value 10 which signals are detected by detection circuitry 47.

Thus, the present invention permits memory arrays utilizing high permeability base plates with posts arranged in any predetermined orientations to be constructed by means of a single base plate with rectangularly positioned posts thereon formed by two sets of orthogonal slots therein and an overlay sheet having a predetermined arrangement of portions of high permeability material affixed thereto. Thus, an easily fabricated base plate may, by means of this invention, be utilized in arrays of types which previously required use of base plates much more difficult to fabricate. Moreover, a single base plate may be utilized, by means of this invention, in any of a variety of arrays which previously required base plates specifically designed for use in each particular array.

FIG. 5 depicts still another embodiment according to the principles of this invention in which particular magnetic flux paths between diagonally adjacent ones of posts positioned in rows and columns are rendered preferred paths by means of a pattern of high permeability material affixed to an overlay sheet. Rectangular posts 52 are formed on high permeability base plate 51 by means of two sets of orthogonal slots cut therein. An overlay sheet 53 of magnetic material having substantially rectangular hysteresis characteristics is positioned over the posts 52 and has a pattern of portions 54 of high magnetic permeability material affixed to the side thereof facing the posts 52. The sheet 53 is aligned relative to the posts 52 such that the portions 54 of high permeability material are contiguous to the posts 52 and aligned relative to the posts according to a predetermined pattern shown in FIG. 5. Overlay sheet 53 is shown broken away in FIG. 5 and the portions 54 are, for illustrative purposes, shown in "phantom" by means of dot-dash lines over the posts 52 of the broken away section.

Bit conductors $55_1$ and $55_2$ and output conductors $56_1$ and $56_2$ are threaded between the posts 52, as shown in FIG. 5, and are connected between ground potential and write pulse source 57 and detection circuitry 58, respectively. Word conductors $59_1$ and $59_2$ are threaded between the posts 52, as shown in FIG. 5, and are connected between ground potential and read and write pulse source 60. The conductors 55, 56, and 59 all follow straight line rather than zig-zag paths within the array. Timing circuit 61 is connected by means of conductors 62 and 63 to sources 57 and 60, respectively.

Pulse sources 57 and 60 are shown in block diagram form and may comprise any well known circuitry capable of providing current pulses of the character described hereinafter. Detection circuitry 58 is also shown in block diagram form and may comprise any circuitry capable of detecting signals induced in conductors 56. Timing circuit 61 is similarly shown in block diagram form and may comprise circuitry capable of timing the energization of sources 57 and 60 during the write phase of operation as described hereinafter.

The embodiment shown in FIG. 5 operates in a manner similar to that described in connection with FIG. 6 of the aforementioned copending application of A. H. Bobeck and J. L. Smith, Ser. No. 215,318, filed Aug. 7, 1962. Thus, if binary word 10 is to be written into the bit addresses associated with word conductor $59_1$, coincident write signals are applied to conductor $59_1$ from source 60 and to conductors $55_1$ and $55_2$ from source 57. The signals applied to conductors $59_1$ and $55_1$ are of positive polarity while a negative polarity signal is applied to conductor $55_2$. The coincident write signals are applied after a previous negative polarity readout signal from source 60. The readout signal is of a magnitude sufficient to establish remanent magnetic conditions directed in a vertical direction, as viewed in FIG. 5, between each pair of posts threaded by conductor $59_1$. The coincidently applied write signals produce magnetomotive forces effective to establish remanent magnetizations in flux paths within the bit addresses defined by conductors $59_1$, $55_1$, and $55_2$ which paths include particular ones of the high permeability portions 54. The arrows 64 represent the remanent magnetization established in the address defined by conductors $59_1$ and $55_1$ and the arrows 65 represent the remanent magnetization established in the address defined by conductors $59_1$ and $55_2$. The write signals are of a magnitude such that their coincident application is sufficient to establish the magnetizations represented by arrows 64 and 65 while noncoincident application is not sufficient to change the previously established magnetic condition. A subsequent readout signal re-establishes the reset magnetic condition and induces output signals in conductors $56_1$ and $56_2$ indicative of the binary value 10 which signals are detected by detection circuitry 58.

The portions of magnetic material 54 positioned diagonally across the posts 52 in FIG. 5 create diagonal flux paths in the array which have a lower reluctance than do horizontally and vertically directed flux paths between the posts 52. Were it not for the portions 54 the horizontal and vertical paths would have a lower reluctance than the diagonal path and a substantial portion of the energy required for the write signals would be dissipated in switching flux within these paths; furthermore, the inductance of conductors 59 and 55 would be increased thereby increasing the read-write cycle time of the array, as discussed hereinbefore.

Furthermore, by means of the portions 54 a narrow uniform gap length of square loop overlay material is established for the diagonal flux paths. All of the diagonal flux paths therefore have the same value of reluctance and flux changes within them occur simultaneously during the read and write phases of operation thereby producing output signals which are of greater magnitude and more distinct.

Moreover, it can be seen that by rotating the sheet 53 by 45°, it could be utilized with another base plate, having properly spaced posts arranged in rows and columns, to form an array operable according to the principle of operation of that shown in FIGS. 1, 2, and 3.

It is to be understood that the specific embodiments of this invention described herein are merely illustrative and that numerous other arrangements according to the principles of this invention may be devised by one skilled in the art without departing from the spirit and scope of this invention.

What is claimed is:

1. A magnetic memory circuit comprising a high magnetic permeability base plate having a bottom portion and a plurality of posts extending from said bottom portion, an overlay magnetic sheet having substantially rectangular hysteresis characteristics positioned over said posts, an insulating means positioned between said bottom portion and said overlay sheet and adapted by means of apertures to fit over said posts, a pattern of electrical conductors being affixed to said insulating means, a pattern of high magnetic permeability material bonded to said overlay sheet on the side of said sheet facing said posts, a first one of said posts being contiguous to a first portion of said high permeability material, a second one of said posts adjacent said first post being contiguous to a second portion of said high permeability material, said first and said second portions of high permeability material separated on said overlay sheet by a distance substantially smaller than the distance between said adjacent first and second posts; a memory cell being defined by said bottom portion, said first and second posts, said first and second portions of high permeability material, and said overlay material; means including said pattern of conductors for establishing a first and a second remanent magnetic condition in said cell, and means for detecting when said cell is switched from said first to said second remanent magnetic condition.

2. A magnetic memory circuit according to claim 1 in which each of the remaining ones of said plurality of posts is contiguous to a distinct portion of said high permeability material and adjacent ones of said distinct portions are positioned substantially closer together than are adjacent ones of said plurality of posts.

3. A magnetic memory circuit according to claim 2 in which said plurality of posts are arranged in rows $m$ units apart and in columns $n$ units apart and in which the corresponding portions of high permeability material are arranged in rows $m$ units apart and in columns substantially less than $n$ units apart.

4. A magnetic memory circuit comprising a high magnetic permeability base plate having a bottom portion and a plurality of posts extending from said bottom portion, an overlay magnetic sheet having substantially rectangular hysteresis characteristics positioned over said posts, an insulating means positioned between said bottom portion and said overlay sheet and adapted by means of apertures to fit over said posts, a pattern of electrical conductors affixed to said insulating means; a plurality of memory cells, each being defined by said bottom portion, two of said posts, and said overlay material, means including patterns of high magnetic permeability material positioned contiguous to said posts for effectively reducing the distance between the two posts of each memory cell without increasing the inductance of said electrical conductors, means including said pattern of conductors for establishing a first and a second remanent magnetic condition in a selected one of said cells, and means for detecting when said cell is switched from said first to said second remanent magnetic condition.

5. A magnetic memory circuit comprising a high magnetic permeability base plate having a bottom portion and a plurality of posts extending from said bottom portion, said posts being rectangularly shaped and arranged in rows and columns on said base plate, an overlay magnetic sheet having substantially rectangular hysteresis characteristics positioned over said posts, a pattern of electrical conductors threading said posts along said rows and columns, adjacent ones of said posts being positioned sufficiently far apart on said base plate to permit said conductors to be easily threaded therebetween; a plurality of memory cells, each being defined by said bottom portion, two adjacent ones of said posts, and said overlay material and each having a plurality of magnetic flux paths therein; means for substantially reducing the magnetic reluctance of flux paths within each of said cells comprising patterns of high magnetic permeability material affixed to said overlay sheet on the side of said sheet facing said posts, each of said posts being contiguous to a distinct portion of said high permeability material, means including said pattern of conductors for establishing a first and a second remanent magnetic condition in a predetermined one of said cells, and means for detecting when said cell is switched from said first to said second remanent magnetic condition.

6. A magnetic memory circuit according to claim 5 in which said portions of high permeability material together with their respective posts form pairs of composite posts which are spatially positioned relative to each other such that magnetic flux paths of varying reluctance are established in each of said cells.

7. A magnetic memory circuit according to claim 6 in which the composite posts of each of said pairs of composite posts are angularly positioned relative to each other.

8. A magnetic memory circuit comprising a high magnetic permeability base plate having a bottom portion and a plurality of posts extending from said bottom portion, said posts being rectangularly shaped and arranged in rows and columns on said base plate, an overlay magnetic sheet having substantially rectangular hysteresis characteristics positioned over said posts, a plurality of first conductors positioned between selected rows of said posts, a plurality of second conductors orthogonal to said first conductors positioned between selected columns of said posts, each of said second conductors passing in one sense between a elected pair of said columns of posts and returning in an opposite sense between an adjacent pair of said columns of posts, a plurality of memory cells defined at the intersections of said first and second conductors, each memory cell comprising four rectangularly arranged ones of said posts, the two memory cells defined at the intersections of a single one of said first conductors and a single one of said second conductors comprising a bit address; means for establishing a preferred flux path between one pair of diagonally opposite posts of one cell of each bit address comprising two portions of high permeability material respectively contiguous to said posts, said portions being affixed to said overlay sheet and positioned on said sheet such that they are separated by a distance substantially smaller than the distance between their respective posts; means for establishing a preferred flux path between one pair of diagonally opposite posts of the other cell of each bit address comprising two portions of high permeability material respectively contiguous to said posts, said portions also being affixed to said overlay sheet and positioned on said sheet such that they are separated by a distance substantially smaller than the distance between their respective posts; means including said first and second pluralities of conductors for establishing a remanent magnetic condition in the preferred flux path of one cell of a selected bit address representative of a first binary value, for establishing a remanent magnetic condition in the preferred flux path of the other cell of said selected bit address representative of a second binary value, and for subsequently detecting the particular binary value stored in said selected bit address.

9. A magnetic memory circuit according to claim 8 in which the two portions of high permeability material associated with each of said memory cells are so positioned on said overlay sheet that they are separated by a narrow region having a uniform width.

10. A magnetic memory circuit according to claim 9 in which the portions of high permeability material affixed to said overlay sheet are rectangular in shape, and are aligned on said sheet in a plurality of parallel rows, each row being along a diagonal of each of its associated memory cells.

11. A magnetic memory circuit comprising a high magnetic permeability base plate having a bottom portion and a plurality of posts extending from said bottom portion, said posts being arranged in rows and columns on said base plate, an overlay magnetic sheet having substantially rectangular hysteresis characteristics positioned over said posts, a plurality of word conductors positioned between selected rows of said posts, each of said conductors passing in one sense between a selected pair of said rows and returning in an opposite sense between an adjacent pair of said rows, a plurality of bit conductors orthogonal to said word conductors positioned between selected columns of said posts, each of said conductors passing in one sense between a selected pair of said columns and returning in an opposite sense between an adjacent pair of said columns, a plurality of memory cells defined at the intersection of said word and bit conductors, each memory cell comprising four rectangularly positioned ones of said posts, the four memory cells defined at the intersections of a single one of said word conductors and a single one of said bit conductors comprising a bit address; means for establishing a preferred flux path between one pair of diagonally opposite posts of each cell of each bit address comprising two portions of high permeability material respectively contiguous to said posts, said portions being affixed to said overlay sheet and positioned on said sheet such that they are separated by a uniform distance substantially smaller than that between their respective posts, the portions of high permeability material associated with the four memory cells of each bit address forming four parallel preferred flux paths; means including said word and bit conductors for establishing a remanent magnetic condition in the preferred flux paths of two cells of a selected bit address representative of a first binary value, for establishing a remanent magnetic condition in the preferred flux paths of the other two cells of the selected address representative of a second binary value, and for subsequently detecting the particular binary value stored in said selected address.

12. A magnetic memory circuit according to claim 11 in which the portions of high permeability material affixed to said overlay sheet are rectangular in shape, are aligned on said sheet in a plurality of parallel rows, and are equidistantly positioned in each of said rows.

13. In magnetic memory circuits including high magnetic permeability base plates having a bottom portion and a plurality of posts arranged in rows and columns extending therefrom, overlay magnetic sheets having substantially rectangular hysteresis characteristics positioned over the posts, and a pattern of conductors threading said posts, the particular mode of operation of said circuits determined by the shape and alignment of said posts and the particular pattern of conductors threading the posts, the improvement comprising a pattern of high magnetic permeability material bonded to one of said overlay sheets on the side of said sheet facing said posts, said pattern of high permeability material comprising rectangular portions arranged in rows and columns on said sheet, the portions in each row being positioned close together, said single overlay sheet being alignable with respect to a first base plate such that the rows of high permeability portions are in alignment with the rows of posts on said first base plate, each high permeability portion being contiguous to a respective one of said posts thereby reducing the magnetic reluctance of flux paths between adjacent posts of each row of posts; said single overlay sheet also being alignable with respect to a second base plate such that the rows of high permeability material are aligned along diagonals of the rows of posts of said plate, each high permeability portion being contiguous to one of said posts thereby reducing the magnetic reluctance of flux paths between diagonally adjacent ones of said posts.

No references cited.

BERNARD KONICK, *Primary Examiner.*

G. LIEBERSTEIN, *Assistant Examiner.*